United States Patent
Sreedhar M et al.

(10) Patent No.: US 10,120,769 B2
(45) Date of Patent: Nov. 6, 2018

(54) RAID REBUILD ALGORITHM WITH LOW I/O IMPACT

(71) Applicant: Dell Products L.P., Round Rock, TX (US)

(72) Inventors: Deepu Syam Sreedhar M, Calicut (IN); Sandeep Agarwal, Bangalore (IN); Krishna Kumar P. K., Bangalore (IN)

(73) Assignee: Dell Products L.P., Round Rock, TX (US)

( * ) Notice: Subject to any disclaimer, the term of this patent is extended or adjusted under 35 U.S.C. 154(b) by 54 days.

(21) Appl. No.: 15/097,795

(22) Filed: Apr. 13, 2016

(65) Prior Publication Data

US 2017/0300393 A1     Oct. 19, 2017

(51) Int. Cl.
*G06F 11/00* (2006.01)
*G06F 11/16* (2006.01)

(52) U.S. Cl.
CPC .... *G06F 11/1658* (2013.01); *G06F 2201/805* (2013.01); *H05K 999/99* (2013.01)

(58) Field of Classification Search
CPC ............. G06F 11/1658; G06F 11/1008; G06F 11/1088
See application file for complete search history.

(56) References Cited

U.S. PATENT DOCUMENTS

| | | | |
|---|---|---|---|
| 5,787,459 A | 7/1998 | Stallmo et al. | |
| 5,913,927 A | 6/1999 | Nagaraj et al. | |
| 6,516,425 B1 | 2/2003 | Belhadj et al. | |
| 6,647,514 B1 | 11/2003 | Umberger et al. | |
| 6,892,276 B2 | 5/2005 | Chatterjee et al. | |
| 6,959,413 B2 | 10/2005 | Humlicek et al. | |
| 7,000,142 B2 | 2/2006 | McCombs | |
| 7,133,966 B2 * | 11/2006 | Sato | G06F 11/008 711/114 |
| 7,281,160 B2 * | 10/2007 | Stewart | G06F 11/2087 714/6.13 |
| 7,774,643 B2 * | 8/2010 | Wang | G06F 11/1435 714/6.13 |
| 8,132,044 B1 * | 3/2012 | Saeed | G06F 11/1088 714/6.1 |
| 8,726,070 B2 | 5/2014 | Nelogal et al. | |
| 9,378,092 B2 * | 6/2016 | Cho | G06F 11/1088 |

(Continued)

*Primary Examiner* — Philip Guyton
(74) *Attorney, Agent, or Firm* — Jackson Walker L.L.P.

(57) ABSTRACT

A disclosed storage management method includes detecting an unrecoverable failure associated with a logical block of a first physical storage device that is one of a plurality of storage devices within a redundant virtual drive that also includes a hot spare drive. Data for the unrecoverable block may be rebuilt from data in the remaining storage devices and stored in a logical block of the hot spare drive. One or more logical block maps may be maintained to identify unrecoverable logical blocks and to indicate the logical blocks and storage devices to which each of the unrecoverable logical blocks is relocated. I/O operations that access "good" logical blocks are normally while accesses to unrecoverable logical blocks are rerouted according to the logical block map. One or more unrecoverable thresholds may be supported to initiate operations to replace storage devices containing unrecoverable blocks exceeding an applicable threshold.

13 Claims, 9 Drawing Sheets

(56) References Cited

U.S. PATENT DOCUMENTS

| | | | |
|---|---|---|---|
| 2006/0041793 A1* | 2/2006 | Cherian | G06F 11/1088 |
| | | | 714/47.1 |
| 2006/0236149 A1 | 10/2006 | Nguyen et al. | |
| 2007/0294570 A1* | 12/2007 | Polisetti | G06F 11/1076 |
| | | | 714/6.13 |
| 2010/0037091 A1* | 2/2010 | Baderdinni | G06F 11/1076 |
| | | | 714/6.12 |
| 2014/0372697 A1* | 12/2014 | Pereira | G06F 11/1088 |
| | | | 711/114 |
| 2015/0269025 A1* | 9/2015 | Krishnamurthy | G06F 11/1092 |
| | | | 714/6.24 |

\* cited by examiner

RAID REBUILD ALGORITHM WITH LOW I/O IMPACT

TECHNICAL FIELD

Disclosed subject matter is in the field of data storage system and methods and, more particularly, data storage system employing a RAID controller and a hot spare drive.

BACKGROUND

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, an information handling system may include a variety of hardware and software components that may be configured to process, store, and communicate information and may include one or more computer systems, data storage systems, and networking systems.

The data storage systems of at least some information handling systems employ redundant array of independent drives (RAID) technology to enable the widespread use of low cost persistent mass storage devices without a corresponding decrease in reliability. RAID technology may employ a plurality of physical storage devices in combination with data redundancy, parity information and/or other form(s) of error checking information, or a combination thereof, to provide a "virtual drive." User data and error checking information may be distributed among the plurality of physical storage devices of a virtual drive in different configurations and granularities.

As a common example, a RAID 5 virtual drive spanning N physical storage devices writes user data to N−1 of the physical storage devices and parity data to the remaining physical storage device. The physical storage device to which the parity information is stored varies depending upon the applicable storage address. A block of user data may be "striped" across N−1 of the N physical storage devices, with each physical storage device storing 1/(N−1) of the user data block. Other RAID configurations employ different combinations of redundancy, striping, and error checking information as is well known in the field of data storage and data storage systems.

RAID-based storage systems may employ one or more redundant physical storage devices that are available to store data from a physical storage device that has exhibited one or more failures. Because these redundant physical storage devices are generally configured such that they can be swapped into a given virtual drive while maintaining power, they are often referred to as hot spare drives, hot spare drives, hot spares, or the like.

Historically, RAID controllers have used hot spare drives in conjunction with a "rebuild" process to restore a virtual drive to a normal state with data integrity following one or more errors. Rebuilding data for a RAID virtual drive can be a time consuming process that increases as the number of physical storage devices increases and as the size or capacity of the physical storage devices increases. A rebuild operation may occupy a significant percentage of a RAID controller's available computing and/or storage bandwidth. In addition, conventional rebuild processes may not be able to withstand a physical storage device failure that occurs during rebuild and, as a result, user data may be permanently lost.

While some RAID levels can recover from two disk failures, e.g., RAID 6, rebuild happens sequentially, rebuilding the first failed disk before rebuilding the second failed disk. However, conventional rebuild implementations cannot recover data if multiple physical storage device failure occur, either simultaneously or serially, during rebuild.

SUMMARY

Disclosed data storage and data management operations, methods, and processes include methods that rebuild unrecoverable logical blocks only, i.e., logical blocks that report one or more unrecoverable errors. For purposes of this disclosure, an unrecoverable error refers to a media error from which data cannot be recovered. In at least one embodiment, a physical storage device with an unrecoverable logical block is not identified or otherwise classified as "failed" physical storage device and, instead, I/O operations associated with the virtual drive that spans the unrecoverable physical storage device continue to proceed with respect to all logical blocks other than the unrecoverable logical block, which may be regenerated and copied to the hot spare. Similarly, if a virtual drive has multiple unrecoverable physical storage devices, only the logical blocks that exhibit the unrecoverable errors will be regenerated. In addition, the regenerated logical blocks from the various physical storage devices of a virtual drive may be copied to the same hot spare. Because the hot spare in this configuration effectively helps to restore operation when unrecoverable errors are distributed across two or more physical storage devices, the hot spare drive may be referred to herein as a "distributed hot spare."

An address map, e.g., a hash table, may be maintained to identify the logical blocks that have been regenerated and the corresponding logical block of the regenerated data. Address maps may be located or each physical storage device, including the distributed hot spare. Address maps may be configured as key-value data structures in which a key identifies an unrecoverable logical block by physical storage device and block address, and the key's corresponding value indicates the logical block, typically located on the distributed hot spare, where the regenerated data is located.

The address map(s) may be accessed during I/O operations so that I/O operations associated with any unrecoverable logical blocks are redirected to the distributed hot spare in accordance with the address map(s). In at least some embodiments, the address maps may be incorporated into the metadata of each physical storage device.

In some embodiments, storage management methods may employ one or more unrecoverable error thresholds to implement options for replacing a physical storage device or distributed hot spare rather than continuing to replace individual unrecoverable logical blocks. In at least one embodiment, a DEVICE COUNT threshold identifies the maximum number of unrecoverable errors that may occur on a single physical storage device before the physical storage device is replaced. If a DEVICE COUNT threshold is reached, a DEVICE COUNT event occurs and available data from the applicable physical storage device can be sequentially copied to a replacement disk along with the physical storage device's regenerated data from the distributed hot spare, after which, the regenerated data may be erased from the distributed hot spare.

A SPARE COUNT threshold may identify the maximum number of recovered logical blocks that the distributed hot spare may store. If a SPARE COUNT threshold is reached, a SPARE COUNT event occurs and one of the physical storage devices in the virtual, e.g., the physical storage device with the most unrecoverable errors, may be identified. After a particular physical storage device is identified, the identified physical storage device may be replaced in the same or similar manner as the replacement of a physical storage device following a DEVICE COUNT event.

Disclosed storage management operations may implemented by blocks, stripes or other grains, segments, or portions of the physical storage device. The storage management methods illustrated in the following FIGUREs employ a stripe-based configuration that beneficially and efficiently extends the virtual drive's RAID 5 configuration to the rebuild operations. Other embodiments may employ different RAID levels and may use rebuild techniques that mirror or otherwise reflect those RAID levels.

Although the storage management operations are described below in the context of a distributed hot spare, the operations may be employed without a distributed hot spare, e.g., by pre-allocating a portion of each physical storage device for storing rebuilt logical blocks. Disclosed subject matter can be implemented on any redundant virtual drive and any redundant RAID level.

Disclosed storage management methods beneficially achieve RAID rebuild operation in a time-efficient and space-efficient manner, with little or low I/O impact during rebuild. Disclosed methods may survive multiple disk failures that occur during rebuild without loss of data. Data associated with unrecoverable errors occurring simultaneously on different stripes of two or more physical storage devices can be rebuilt.

The service life of storage media may increase significantly depending upon the threshold value selected for identifying an acceptable number of failed disks. This is especially important with the proliferation and wide spread adoption of flash media (NVMe SSDs for example) which can accommodate only a fixed number of writes/updates.

The above summary is not intended as a comprehensive description of the claimed subject matter but, rather, is intended to provide an overview of the applicable subject matter. Other methods, systems, software, functionality, features and advantages of the claimed subject matter will be or will become apparent to one with skill in the art upon examination of the following figures and detailed written description.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
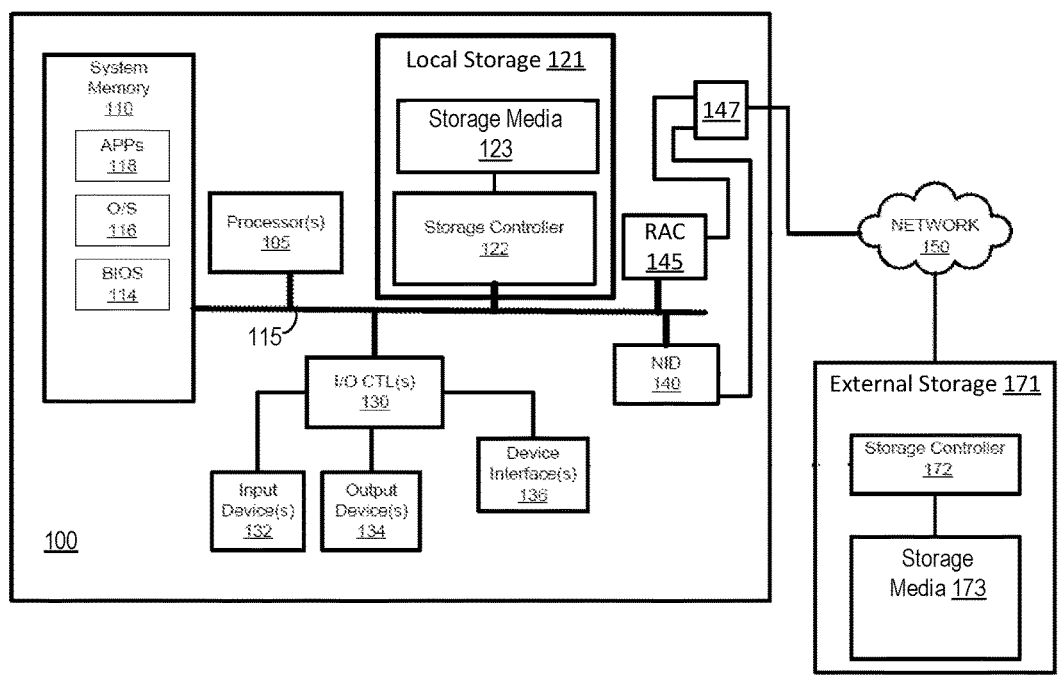
FIG. 1 illustrates a block diagram representation of an example information handling system, in accordance with embodiments of the present disclosure.

In the following detailed description of exemplary embodiments, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from the general scope of the disclosure. The following detailed description is, therefore, not to be taken in a limiting sense, and the scope of the present disclosure is defined by the appended claims and equivalents thereof.

References within the specification to "one embodiment," "an embodiment," "at least one embodiment", or "some embodiments" and the like indicate that a particular feature, structure, or characteristic described in connection with the embodiment is included in at least one embodiment of the disclosed subject matter. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not for other embodiments.

It is understood that the use of specific component, device, and/or parameter names and/or corresponding acronyms thereof, such as those of the executing utility, logic, and/or firmware described herein, are exemplary only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of disclosed embodiments to embodiments in which different element, feature, protocol, or concept names are utilized. Thus, each term utilized herein is to be given its broadest interpretation given the context in which that term is utilized.

In at least one aspect, disclosed subject matter includes a data storage method that includes detecting an unrecoverable error in a redundant virtual drive, i.e., a virtual drive that comprises a plurality of physical storage devices and a hot spare drive. A particular source disk and a particular logical block address associated with the unrecoverable error may be determined. If the virtual drive implements a striped data configuration, the method may then determine whether the unrecoverable error is the first error associated with its particular stripe. If it determined that the unrecoverable error is the first error associated with the particular stripe, the method may regenerate data corresponding to the particular logical block from the remaining physical storage devices in the virtual drive. The regenerated data may then be stored to a first stripe of the hot spare drive and an entry in a mapping structure may be created to associate the particular source disk and the particular stripe of the particular logical block address corresponding to the unrecoverable error with the first stripe of the hot spare drive.

If the unrecoverable error is not the first unrecoverable error associated with the particular stripe, the method may copy a different logical block, e.g., a logical block stored in a different stripe of the particular source disk, to a second stripe of the hot spare drive. The logical block may then be generated from the first stripe of the hot spare drive and from the applicable logical block of the other physical storage devices, i.e., the physical storage device that have not reported an unrecoverable error on the applicable stripe of data. The regenerated logical block may then be stored to a different stripe on the same physical storage device. Entries mapping the particular logical block to the new stripe and mapping the different logical block to the second stripe of the hot spare drive may be created.

If an unrecoverable error associated with the first stripe of the hot spare drive is subsequently detected, data for the first stripe of the hot spare drive may be regenerated and the regenerated data may be stored to a second stripe of the hot spare drive. Regenerating the first stripe of the distributed hot spare drive may include regenerating from data at least one logical block that was previously relocated to one of the source disks. In other cases, a remapped logical block may be remapped to the hot spare drive.

In some embodiments, the detection of a DEVICE COUNT event, in which the number of logical block errors on a first source disk exceeds a DEVICE COUNT threshold, results in replacement operations that include copying remaining good blocks of the first source disk to a replacement disk, copying remapped portions of the first source disk to the replacement disk, and removing from the mapping structure(s), entries associated with the first source disk.

The detection of a SPARE COUNT event, in which the total number of logical block errors on the hot spare drive exceed a SPARE COUNT threshold, may initiate replacement operations that include identifying a candidate source disk based on a number of logical block errors associated with the candidate source disk. After identifying a candidate source disk, the replacement operations may resemble the replacement operations that occur following a DEVICE COUNT event.

In another aspect, a disclosed storage controller includes a processor and a computer readable medium including processor executable instructions that, when executed by the processor, cause the processor to perform operations that include detecting an unrecoverable failure associated with a logical block of a first physical storage device, where the first physical storage device is one of a plurality of physical storage devices spanned by a virtual drive. Data for the logical block from may be rebuilt from data in corresponding logical blocks of the other physical storage devices of the virtual drive. Rebuilt data may then be stored in a first logical block of a hot spare drive and an address map may be maintained for the first physical storage device to identify logical blocks of the first physical storage device containing unrecoverable failures and to indicate relocated logical blocks for each of the logical blocks identified. Separate address maps may be maintained for each of the plurality of physical storage devices in the virtual drive and for the hot spare drive. In at least one embodiment, the redundant virtual drive comprises a RAID virtual drive.

In an embodiment in which the RAID virtual drive is a RAID 5 virtual drive, rebuilding data for a logical block comprises performing an exclusive or (EXOR) operation on remaining corresponding logical block on the remaining physical storage devices where the set of corresponding logical blocks define a RAID 5 stripe of data.

The storage controller may detect a second unrecoverable error associated with a second logical block on a second physical storage device of the virtual drive and determine whether a data stripe corresponding to the second logical block includes any other logical blocks associated with a unrecoverable error. If the second logical block is of the same data stripe as the first logical block, the storage controller may perform "same-stripe" rebuilding operations that include copying data for a different logical block of the second physical storage device to a distributed hot spare drive and performing an exclusive OR (EXOR) of the relocated first logical block on the distributed hot spare drive and a third logical block, associated with a third physical storage device, of the virtual drive.

The storage controller may also detect a third unrecoverable error associated with a first logical block of the distributed hot spare drive and, in response, rebuild the data from a relocated logical block of the second physical storage device and a third logical block associated with the third physical storage device.

FIG. 1 illustrates a block diagram representation of an example information handling system (IHS) 100, within which any one or more described features of disclosed embodiments can be implemented. For purposes of this disclosure, an IHS, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an IHS may be a handheld device, personal computer, a server, a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices, as well as various I/O devices, such as a keyboard, a mouse, and a video display. The IHS may also include one or more busses operable to transmit communications between the various hardware components.

Referring specifically to FIG. 1, example IHS 100 includes one or more processor(s) 105 coupled to system memory 110 via system interconnect 115. System interconnect 115 may be referred to herein as a system bus. The system memory 110 illustrated in FIG. 1 includes therein a plurality of modules, including firmware 112, basic input/output system (BIOS) 114, an operating system (OS) 116 and one or more application program(s) 118. Each of the various modules may include program code comprising one or more processor-executable instructions that implement varying functionality when their corresponding program code is executed by processor(s) 105 or other processing devices within IHS 100.

The IHS 100 of FIG. 1 further includes one or more I/O controllers 130 which support connection by, and processing of signals from, one or more connected input device(s) 132, such as a keyboard, mouse, touch screen, or microphone. I/O controllers 130 also support connection to and forwarding of output signals to one or more connected output devices 134, such as a monitor or display device or audio speaker(s). Additionally, in one or more embodiments, one or more device interface(s) 136, such as an optical reader, a universal serial bus (USB), a card reader, Personal Computer Memory Card International Association (PCMCIA) slot, and/or a high-definition multimedia interface (HDMI), can be associated with IHS 100. Device interface(s) 136 can be utilized to enable data to be read from or stored to corresponding removable storage device(s), such as a compact disk (CD), digital video disk (DVD), flash drive, or flash memory card. In one or more embodiments, device interface(s) 136 can also provide an integration point for connecting other device(s) to IHS 100. In such implementation, device interface(s) 136 can further include General Purpose I/O interfaces such as I2C, SMBus, and PCI buses.

The IHS 100 illustrated in FIG. 1 includes a network interface device (NID) 140. NID 140 may enable IHS 100 to communicate and/or interface with other devices, services, and components that are located external to IHS 100. These devices, services, and components can interface with IHS 100 via an external network, such as example network 150, using one or more communication protocols. Network 150 can be a local area network, wide area network, personal area network, and the like, and the connection to and/or between network 150 and IHS 100 can be wired or wireless or a combination thereof. For purposes of discussion, network 150 is indicated as a single collective component for simplicity. However, it is appreciated that network 150 can comprise one or more direct connections to other devices as well as a more complex set of interconnections as can exist within a wide area network, such as the Internet.

FIG. 1 further illustrates local storage 121, connected to system interconnect 115. The local storage 121 of FIG. 1 includes a storage controller 122 coupled to storage media 123, which may include one or more physical storage devices configured as one or more redundant virtual drives.

FIG. 1 further illustrates external storage 171, connected to system interconnect 115 through one of two illustrated connections controlled by a switch 147. Switch 147 connects external storage 171 to IHS 100 via either a remote access controller 145 or the network interface device 140. Like local storage 121, external storage 171 of FIG. 1 includes a storage controller 172 coupled to storage media 173, which, like storage media 123 of local storage 121, may include one or more physical storage devices configured as one or more redundant virtual drives.

Both local storage 121 and external storage 171 may store user data that may include executable instructions as well as non-instruction data may be stored.

Figure 2:
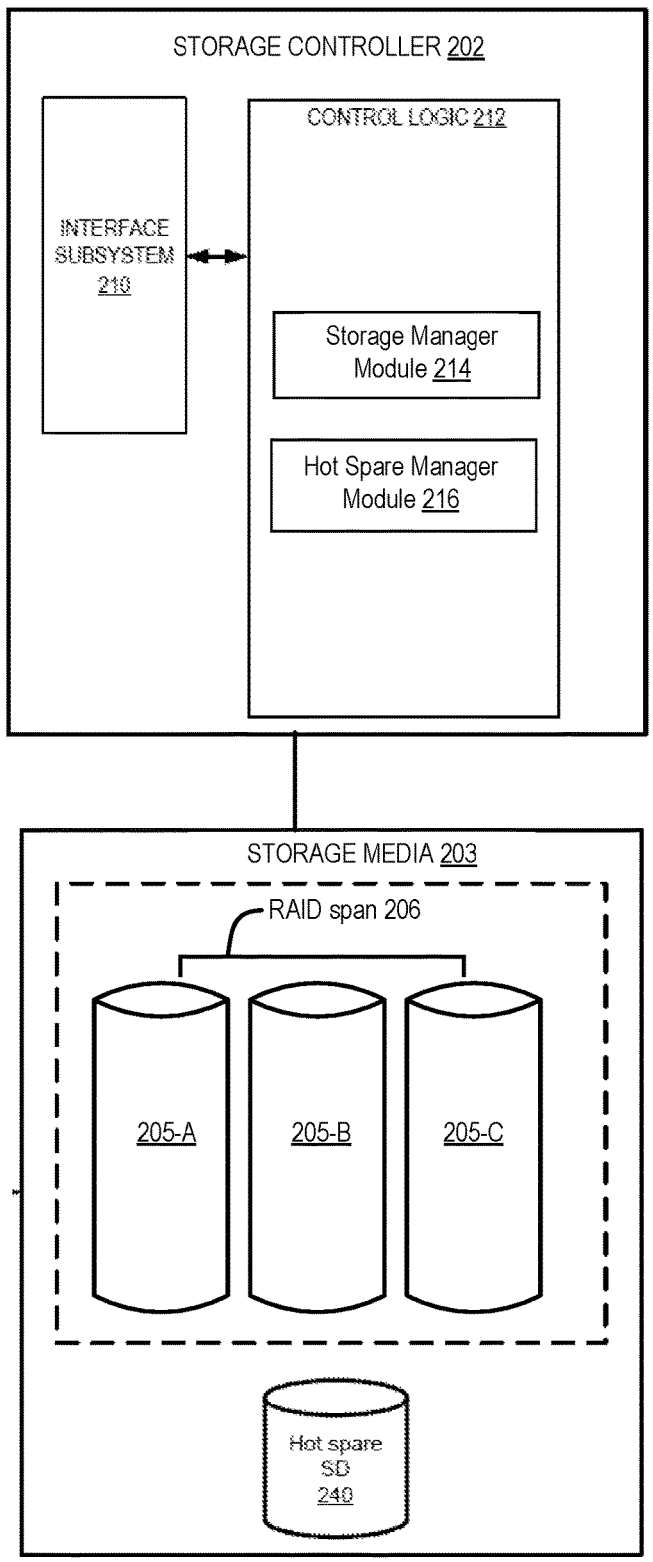
FIG. 2 illustrates an embodiment of a storage system, in accordance with embodiments of the present disclosure.

Referring now to FIG. 2, an embodiment of a storage system 201 is illustrated. Storage system 201 may be suitable for use as the local storage 121 and/or external storage 171 of FIG. 1. The storage system 201 illustrated in FIG. 2 includes a storage controller 202 and storage media 203. In at least some embodiments, storage controller 202 may represent the storage controller 122 of local storage 121 in FIG. 1 or the storage controller 172 of external storage 171 in FIG. 1. Similarly, storage media 203 may represent the storage media 123 of local storage 121 in FIG. 1 or the storage media 173 of external storage 171 in FIG. 1.

In at least some embodiments, storage controller 202 controls and manages the flow of commands and data between processor(s) 105 of IHS 100 (FIG. 1) and storage media 230. In embodiments that employ RAID technology storage controller 202 may be referred to as RAID controller 202.

The storage media 203 of FIG. 2 includes a redundant RAID volume 206, also referred to herein as virtual RAID span 206, RAID span 206, virtual drive 206, or redundant virtual drive 206, comprising three physical storage devices 205 including a first physical storage device 205-A, a second physical storage device 205-B, and a third physical storage device 205-C, as well as a hot spare drive 240, sometimes referred to herein as distributed hot spare 240. While the illustrated RAID span 206 spans three physical storage devices 205, RAID span 206 may include more or fewer physical storage devices in other embodiments.

The storage media 203 of FIG. 2 is illustrative of 3-drive RAID 5 span 206, in which a data block is stored as a stripe in which ½ of the data block is written to a logical block on one of physical storage devices 205, the remaining half of the data block is stored in a corresponding logical block of a second physical storage device 205, and parity data corresponding to the two data block portions is stored on the remaining physical storage device 205.

The hot spare drive 240 may be used to replace a failing or failed physical storage device 205 in RAID span 206. In addition, as disclosed herein, hot spare drive 240 may be used to store individual unrecoverable logical blocks, i.e., logical blocks containing an unrecoverable error, from one or more of the physical storage devices 205.

The storage controller 202 illustrated in FIG. 2 includes an interface subsystem 210 and control logic 212. Interface subsystem 210 may manage communications between control logic 212 and system interconnect 115 of IHS 100 (FIG. 1). The control logic 212 of FIG. 2 includes several functional modules or processes including storage manager module 214 and hot spare manager module 216 either of which may be implemented as software, logic or other hardware, firmware, or a combination thereof.

Storage manager module 214 may manage the reading of user data from and writing of user data to storage media 203. Storage manager module 214 may support any one or more RAID levels or other data redundancy techniques to improve storage reliability. Storage manager module 214 may group the physical storage devices 205 into one or more RAID spans 206, one of which is illustrated in FIG. 2. Hot spare manager module 216 may manage the rebuilding of data in hot spare storage device 240 when one or more physical storage devices 205 fail or when one or more logical blocks within a storage device 205 fails as described in greater detail with respect to FIG. 3 through FIG. 9.

Those of ordinary skill in the art will appreciate that the hardware components and basic configuration depicted in FIG. 1 and FIG. 2 and described herein may vary. For example, the components of IHS 100 illustrated in FIG. 1 are not intended to be exhaustive, but rather are representative to highlight components that can be utilized to implement aspects of the present disclosure. For example, other devices/components may be used in addition to or in place of the hardware depicted. The depicted examples do not convey or imply any architectural or other limitations with respect to the presently described embodiments and/or the general disclosure.

Figure 9:
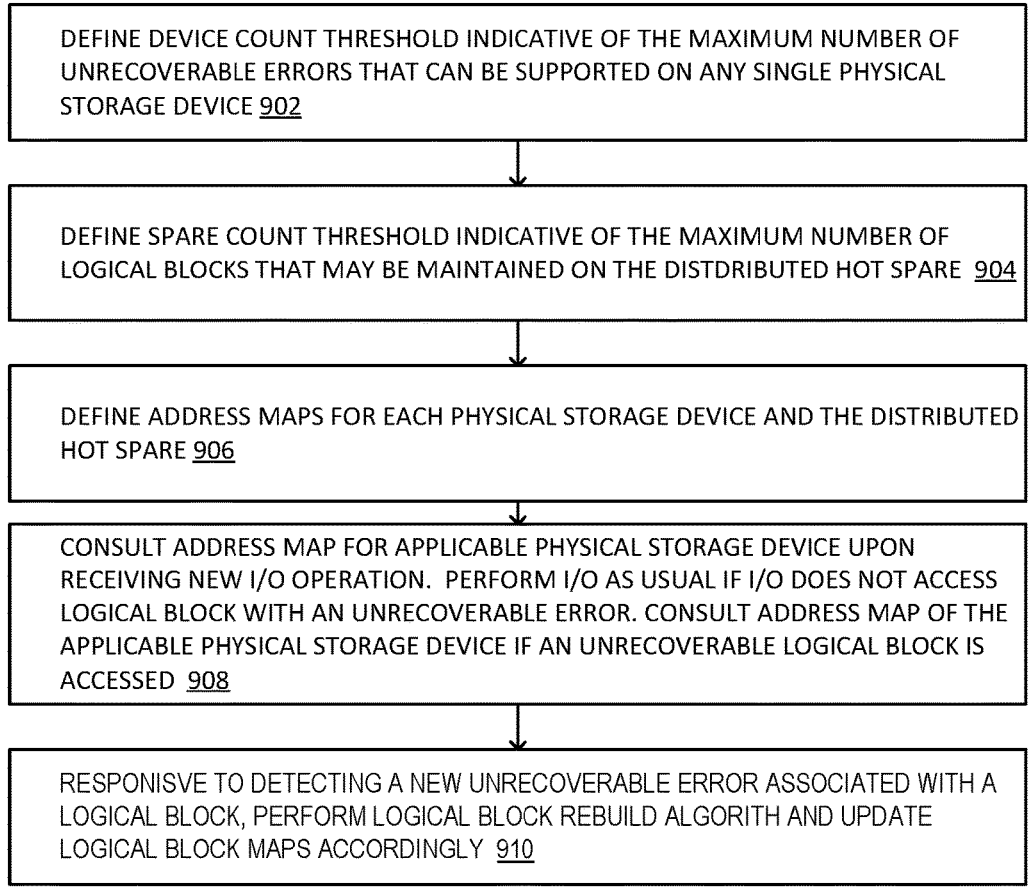
FIG. 9 illustrates a flow diagram of an overview of a data storage and management method.

Referring now to FIG. 9, an overview of a data storage and management method 900 is illustrated in flow diagram format. The illustrated method 900 represents operations that may be performed by RAID controller 202 in conjunction with logical block rebuild operations described herein. In at least one embodiment of the logical block rebuild operations, a physical storage device that reports and unrecoverable error in a logical block is not marked as a failed drive. Instead, operations are performed to regenerate the failed logical block's data and relocate the data to another, still functioning logical block, such as a different logical block on the same physical storage device 205 or a logical block on hot spare drive 240.

In the method 900 illustrated in FIG. 9 an unrecoverable error count may be maintained for each physical storage device and method 900 may include defining (block 902) a DEVICE COUNT threshold indicative of the maximum number of unrecoverable errors that can be supported on any single physical storage device 205. A unique DEVICE COUNT may be defined for each physical storage device 205 in a redundant virtual drive 206. Alternatively, two or more physical storage devices 205 may share a common DEVIC COUNT threshold. In addition, a SPARE COUNT threshold may be defined for hot spare drive 240.

Method 900 may further include defining (operation 904) a SPARE COUNT threshold indicative of the maximum number of logical blocks that may be allocated from hot spare drive 240. Violation of the SPARE COUNT threshold may trigger a SPARE COUNT event to assign a new replacement disk as described below.

In the method 900 of FIG. 9, address maps are generated (block 906) and maintained for each physical storage device 205 and for the hot spare drive 240. The address maps may be incorporated into the metadata of a physical storage device and may be configured as a key-value data structure. Unless an I/O operation addresses an unrecoverable logical block that was subsequently rebuilt and relocated to a distributed hot spare or elsewhere, incoming I/O operations are serviced (block 908) by the applicable physical storage device 205, even if the physical storage device 205 has previously reported one or more unrecoverable errors on other logical blocks.

To ensure correct operation for each I/O operation that accesses one of the physical storage devices 205, the address map of the applicable physical storage device is indexed or otherwise consulted to determine whether the applicable I/O operation is targeted for a logical block with a previously reported unrecoverable error. If so, the I/O operations is redirected to the relocated address of the applicable logical block.

Upon detecting a new unrecoverable error, the storage management method 900 of FIG. 9 may initiate (block 910) a logical block rebuild operations such as the logical block rebuild operations illustrated in FIG. 3 through FIG. 8.

Figure 3:
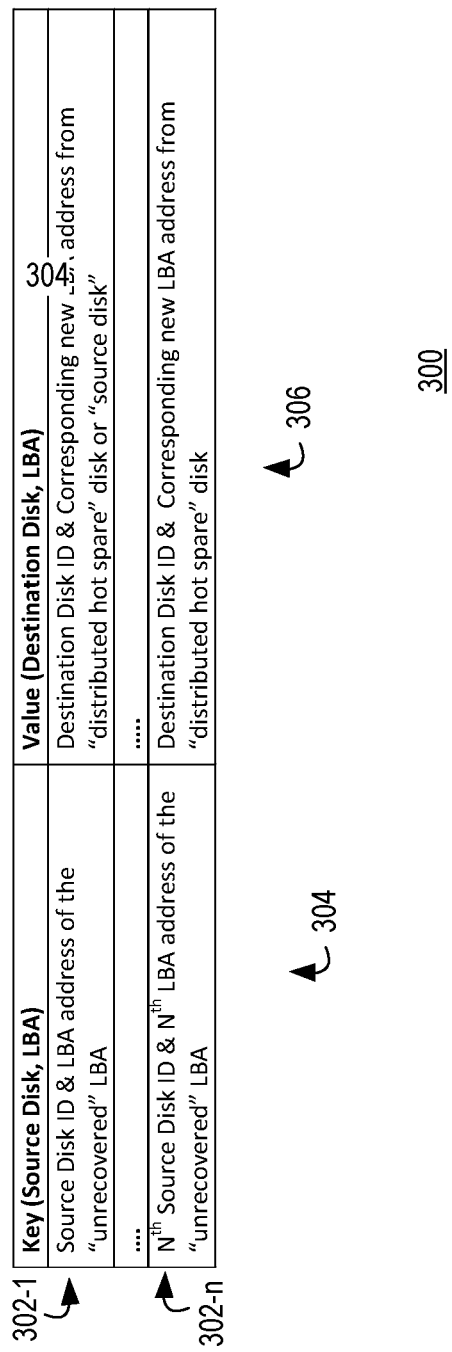
FIG. 3 illustrates an exemplary logical block map, in accordance with embodiments of the present disclosure.

Referring now to FIG. 3, an exemplary logical block map 300 suitable for use in conjunction with a redundant virtual drive that spans a plurality of physical storage devices and includes a hot spare drive is depicted. The logical block map 300 may be used in conjunction with storage management and data management techniques for handling unrecoverable failures associated with one or more logical blocks of storage. In at least one embodiment, data associated with a failed logical block is regenerated and stored elsewhere within the virtual drive.

Logical block map 300 may be maintained to record unrecoverable logical blocks, i.e., the source disk and logical block address of each logical block that has reported one an unrecoverable error, and to indicate the disk and logical block to which each unrecoverable logical block is relocated. A logical block map 300 may be maintained for each physical storage device of a virtual drive. The logical block map 300 may be referenced during storage accesses so that storage accesses to logical blocks that have been rebuilt and relocated can be re-routed to the appropriate locations.

Under the generally reasonable assumption that the size, i.e., the amount of data, associated with a logical block is generally small relative to the capacity of the physical storage device on which a logical block is stored, rebuilding and relocating individual logical blocks is preferable to discarding and rebuilding an entire physical storage device in response to one or a small number of unrecoverable failures.

In at least one embodiment, the logical block map 300 illustrated in FIG. 3 may be used to identify unrecoverable logical blocks and their corresponding relocated logical blocks. Identifying a logical block, whether original or unrecoverable, may include identifying a physical storage device, or distributed hot spare, and a logical block associated with the physical storage device or distributed hot spare.

The logical block map 300 illustrated in FIG. 3 is implemented as a key-value data structure in which each element or entry 302 includes a key 304 indicating an unrecoverable logical block, i.e., a logical block that has reported an unrecoverable error, and a value 306 indicating the corresponding re-built and re-located logical block. Thus, for example, logical block map 300 includes a first entry 302-1 that includes a first key 304-1 and a corresponding value 306-1, which may be referred to as a first key value or, more simply, a first value 306-1. The first key 304-1 may identify a physical storage device, sometimes referred to herein as the source drive, and the logical block address of the unrecoverable logical block. The first value 306-1 may identify one of the physical storage devices or the distributed hot drive spare and a logical block within the applicable storage device.

Figure 4:
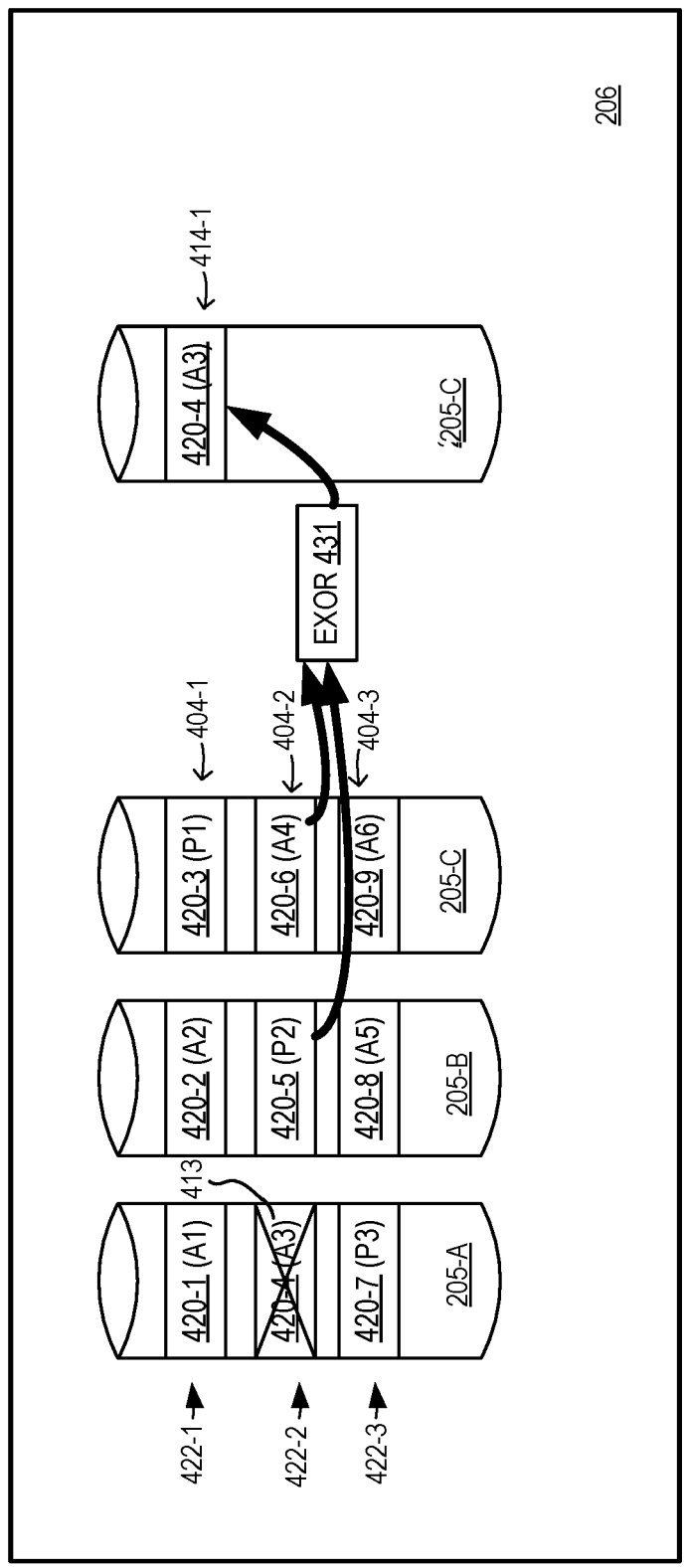
FIG. 4 illustrates a redundant RAID span, in accordance with embodiments of the present disclosure.

Referring now to FIG. 4 through FIG. 7, logical block rebuild operations of a storage management and data management process are illustrated with a sequence of images illustrating sequential states of a redundant virtual drive 206 referred to herein as redundant RAID span 206. Referring to FIG. 4, the illustrated redundant RAID span 206 spans multiple physical storage devices 205, sometimes referred to herein simply as physical storage device(s) 205. Physical storage device 205 may represent a ferro-magnetic hard disk drive, a solid state drive, or another suitable form of persistent mass storage.

Physical storage devices 205 may be of any suitable protocol (e.g., SCSI, SATA, PCIe, etc., size, or configuration. Although the FIGUREs presented and discussed herein illustrate a redundant RAID span 206 that includes three physical storage devices 205-A, 205-B, and 205-C, employing a RAID 5 storage protocol, i.e., data and parity striped across all three physical storage devices 205, and a hot spare drive 240, sometimes referred to herein a distributed hot spare drive 240, other virtual drives 206 may include more or fewer physical storage devices and may implement the same or a different RAID level while still implementing disclosed storage management and data management processes.

FIG. 4 illustrates redundant RAID span 206 after nine (9) virtual blocks 420-1 through 420-9 have been stored to redundant RAID span 206. Consistent with a RAID 5 configuration spanning three (3) physical storage devices 205, the nine virtual blocks 420-1 through 420-9 encompass three data stripes, 422-1 through 422-3, where each data stripe 422 includes two (2) blocks of user data, e.g., A1 and A2, and a parity block, e.g., P1. As seen in FIG. 4, each physical storage device 205 has stored data in three of its logical block addresses 404 including a first logical block address 404-1, a second logical block address 404-2, and a third logical block address 404-3. Thus, the redundant RAID span 206 illustrated in FIG. 4 includes a first data stripe 422-1, comprising data blocks A1 and A2 and parity block P1, stored in first, second, and third virtual blocks 420-1 through 420-3. A second data stripe 422-2, comprising user data A3, user data A4, and parity block P2, is illustrated distributed across virtual blocks 420-4, 420-5, and 420-6, and so forth.

FIG. 4 illustrates detection of an unrecoverable error 413 reported by or detected by physical storage device 205-A. The unrecoverable error 413 illustrated in FIG. 4 occurs in a second logical block address 404-2 of first physical storage device 205-A and occurs within a second stripe 422-2 of redundant RAID span 206. Second stripe 422-2 encompasses virtual blocks 4, 5, and 6, corresponding to the logical block addresses 404-2 in each of the three physical storage devices 205.

FIG. 4 further illustrates data management operations performed, for example, by a RAID controller 202 configured to control redundant RAID span 206 in compliance with the applicable RAID level. Although physical storage device 205-A has an unrecoverable logical block, the storage controller operations represented in FIG. 4 rebuild the applicable data and relocate the virtual block 420-4 to a functioning logical block elsewhere, e.g., on distributed hot spare 240.

As depicted in FIG. 4, the A3 user data associated with virtual block 420-4, corresponding to logical block address 404-2 of physical storage device 205-A, is relocated by rebuilding the applicable data, i.e., the data stored in the unrecoverable logical block, using the data recovery features of the applicable RAID level. In the example depicted in FIG. 4, in which redundant RAID span 206 employs RAID 5, the A3 user data that was stored in virtual block 420-4, i.e., the corrupted data that was stored in second logical block address 404-2 of physical storage device 205-A is rebuilt by performing an EXOR function 431 of the data from still-functional logical block addresses 404 of the applicable data stripe 422. In FIG. 4, for example, the A3 user data that was stored in virtual block 420-4 (second logical block address 404-2 of physical storage device 205-A) is recovered by performing EXOR operation 431 on the P2 parity data stored in virtual block 420-5, which corresponds to second logical block address 404-2 of physical storage device 205-B, and the A4 user data stored in virtual block 420-6, which occurs in second logical block address 404-2 of physical storage device 205-C.

FIG. 4 further illustrates that, having performed the applicable rebuilding of the A3 user data lost to the unrecoverable error 413, the rebuilt data is stored to a first logical block address 414-1 of distributed hot spare 240. An address map of physical storage device 205-A (not depicted), which may resemble the logical block map 300 of FIG. 3, is then updated to reflect the relocation of virtual block 420-4 from second logical block address 404-2 of physical storage device 205-A to the first logical block address 414-1 of distributed hot spare 240. By rebuilding and re-locating individual data blocks 404 as they fail, the disclosed storage management method can resume operation without regenerating, copying, or performing any other time consuming operation with respect to the functional data blocks. In addition, the disclosed storage management method beneficially extends the life of each physical storage device 205, such as physical storage device 205-A, by not discarding an entire physical storage device in response to detecting an unrecoverable error associated with a single logical block.

Figure 5:
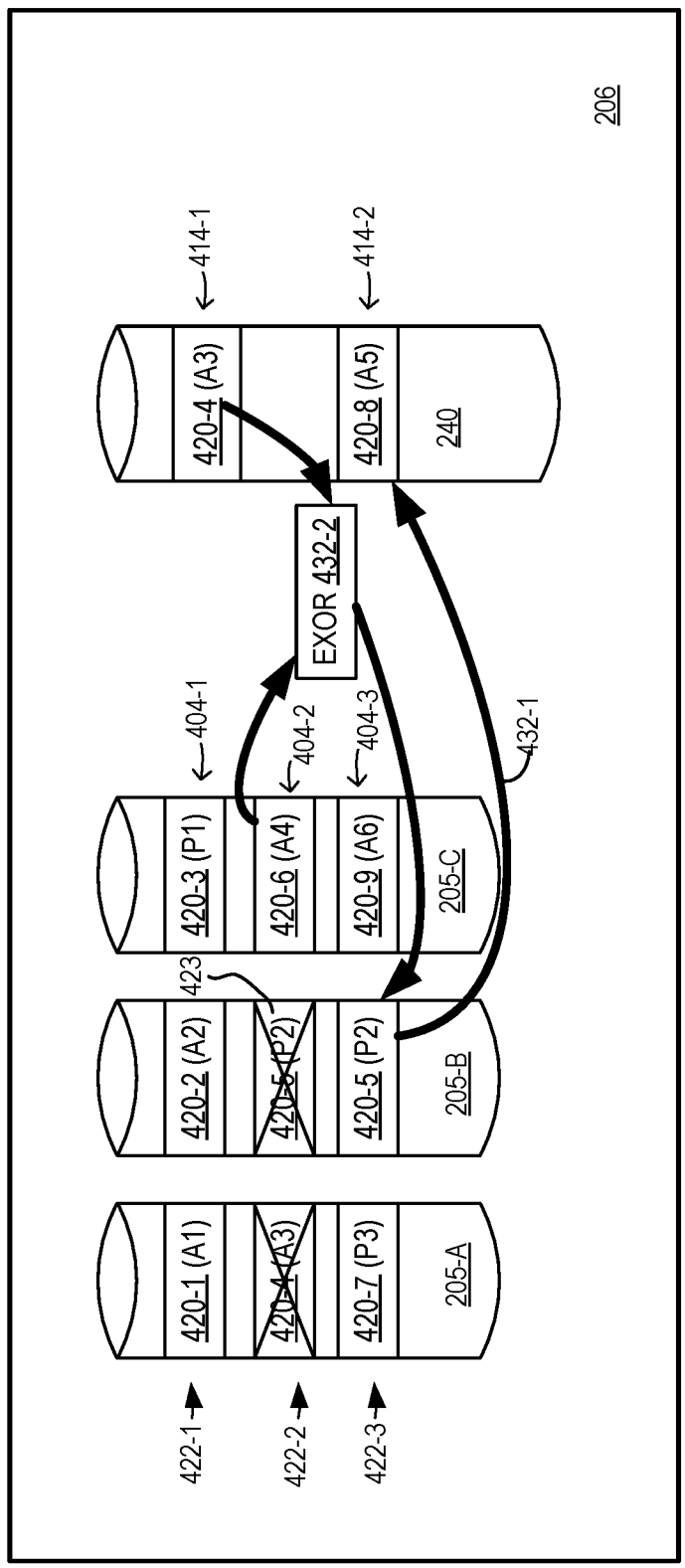
FIG. 5 through FIG. 7 illustrate subsequent states of the redundant RAID span, in accordance with embodiments of the present disclosure.

FIG. 5 illustrates a state of redundant RAID span 206 subsequent to FIG. 4 in which physical storage device 205-B reports a non-recoverable error 423 associated with virtual block 420-5, containing parity information P2. As illustrated in FIG. 5, the logical block address 404-2 of physical storage device 205-B corresponding to virtual block 420-5 is in the same data stripe, 422-2, as the virtual block 420-4 that incurred the unrecoverable error 413 described with respect to FIG. 4. Because the unrecoverable error associated with virtual block 420-5 occurs in a data stripe 422 that has a previous unrecoverable error on at least one of the other physical storage devices 205, the storage management operations illustrated in FIG. 4 for responding to the unrecoverable error for virtual block 420-4 in physical storage device 205-A cannot be used with respect to the unrecoverable error for virtual block 420-5 in physical storage device 205-B.

The storage management operations illustrated in FIG. 5 respond to detecting the unrecoverable error of virtual block 420-5 by first copying (operation 432-1) data from a different logical block address 404 of physical storage device 205-B, i.e., a logical block address of physical storage device 205-B other than logical block address 404-2, to distributed hot spare 240. FIG. 5 illustrates logical block address 404-3 of physical storage device 205-B, which contains A5 user data, as the different logical block address. Thus, the copying operation 432-1 of FIG. 5 copies A5 user data from logical block address 404-3 of physical storage device 205-B to a logical block address 414-2 of hot spare drive 240.

The copying of logical block address 404-3 from physical storage device 205-B to logical block address 414-2 of hot spare drive 240 frees logical block address 404- to store P2 parity data as it is rebuilt.

After freeing up logical block address 404-3 on physical storage device 205-B, the storage management operations illustrated in FIG. 5 regenerate the P2 parity data associated with the unrecoverable error of virtual block 420-5. As illustrated in FIG. 5, regeneration of the P2 parity data is achieved by performing an EXOR operation 432-2 of data originating from the same logical block address as the original P2 parity data, i.e., logical block address 404-2 in the depicted example. However, because the data stripe 422-2 associated with logical block address 404-2 includes a previously occurring unrecoverable error, i.e., the unrecoverable error 413 (FIG. 4) associated with A3 user data virtual block 420-4 at logical block address 404-2 of physical storage device 205-A, EXOR operation 432 of FIG. 5 must access the relocated A3 user data virtual block at logical block address 414-1 of hot spare drive 240 as described in FIG. 4, the EXOR operation 432 illustrated in FIG. 5 performs an EXOR operation of the first logical block address 414-1 of distributed hot spare 240 and the second logical block address 404-2 of physical storage device 205-C.

As further illustrated in FIG. 5, the regenerated data resulting from EXOR operation 432-2 is stored (operation 433) on logical block address 404-3 of physical storage device 205-B, which is the logical block that was freed up prior to regenerating the data associated with the unrecoverable error. In the case illustrated in FIG. 5, the regenerated P2 parity data resulting from EXOR operation 432 is stored to logical block address 404-3 of physical storage device 205-B.

Figure 6:
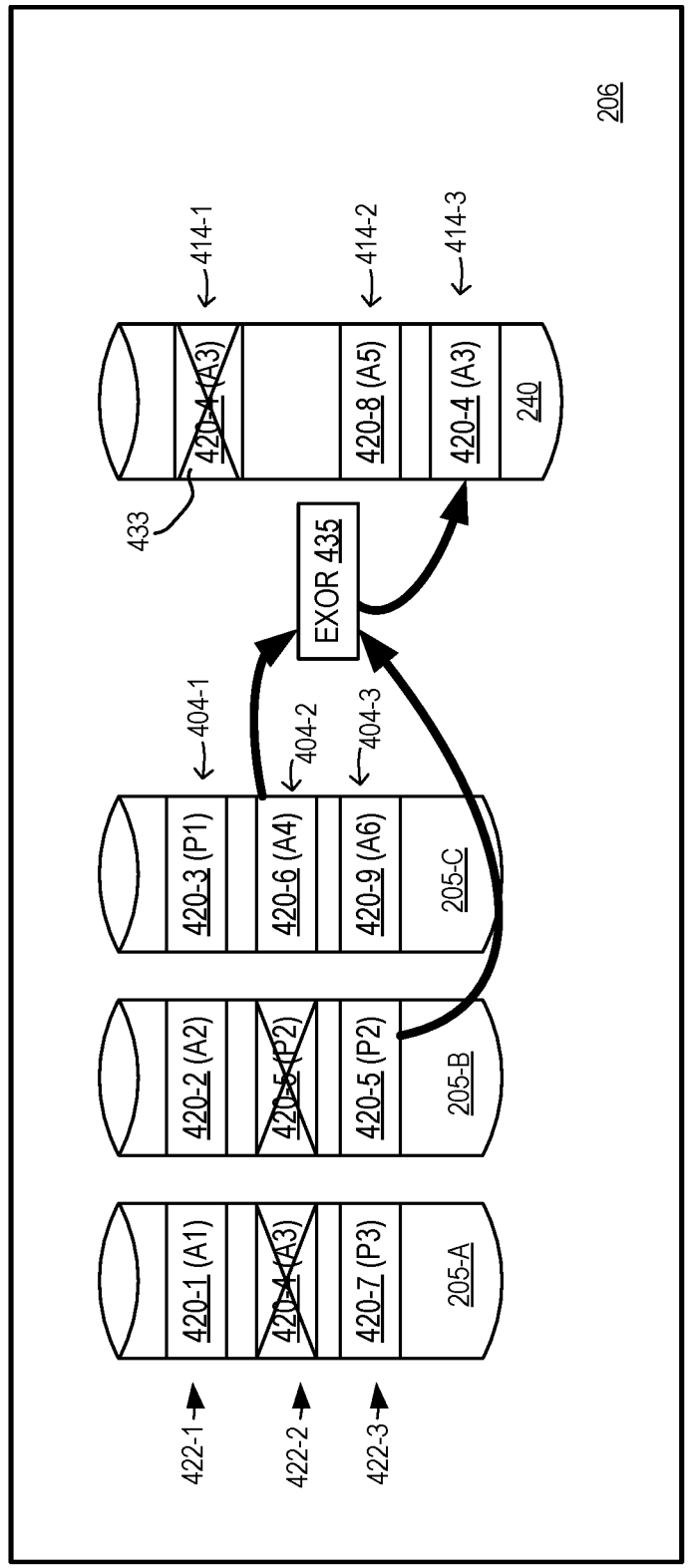

The logical block map 300 of physical storage device 205-B is modified to reflect the relocation of the virtual block 420-8, containing A5 user data, from logical block address 404-3 of physical storage device 205-B to second logical block address 414-2 of distributed hot spare 240 and the relocation of P2 parity data corresponding to virtual block 420-5 from the unrecoverable logical block address 404-2 of physical storage device 205-B to logical block address 404-3 of physical storage device 205-B. By relocating a logical block address 404 on the same physical storage device 205 and then using the freed up logical block as the destination for storing the recovered data, the operations illustrated in FIG. 5 achieve a potentially superior recovery time by performing only one I/O operation per physical storage device per cycle. For example, if FIG. 5 responded to the unrecoverable error of virtual block 420-5 by regenerating the P2 parity data from the A4 user data on physical storage device 205-C and the relocated A3 user data on distributed hot spare 240 and storing the regenerated P2 parity data to distributed hot spare 240, each regeneration operation would require a read of data from distributed hot spare 240 and a write of data to distributed hot spare 240. In contrast, each regeneration operation as illustrated in FIG. 5 requires just one I/O access of the applicable physical storage devices. In at least some embodiments, the benefits achieved by the illustrated storage management procedure more than offset the time required to move the A5 user data from physical storage device 205-B to distributed hot spare 240. FIG. 6 illustrates a subsequent state of redundant RAID span 206, in which distributed hot spare 240 reports an unrecoverable error 433 associated with the A3 user data stored in logical block address 414-1 of distributed hot spare 240. As illustrated in FIG. 6, the A3 user data is regenerated, for the second time, using the remaining blocks of data from the data stripe 422-2, which includes the A4 user data stored in logical block address 404-2 of physical storage device 205-C and the P2 parity data, which was originally stored in logical block address 404-2 of physical storage device 205-B and which was relocated to logical block address 404-3 of physical storage device 205-B in the previously described operations illustrated in FIG. 5. As was true when the P2 parity data was regenerated in FIG. 5, the regeneration of the A3 data is achieved with an EXOR operation 435 that accesses each applicable disk once. Specifically, the regeneration illustrated in FIG. 6 reads A4 user data from physical storage device 205-C and relocated P2 parity data from physical storage device 205-B. These two pieces of data are EXOR'ed and the result is then stored to a new logical block, logical block address 414-3 of distributed hot spare 240. Logical block map 300 is updated to reflect the new location of the A3 user data and redundant RAID span 206 is thereby able to continue to operate using the original set of three physical storage devices 205 and the distributed hot spare 240 despite unrecoverable failures occurring on three (3) of the four (4) physical storage devices. Moreover, the described process maintains the RAID 5 striped configuration of the original data by ensuring that each of the N portions of a particular stripe are stored on N of the N+1 available storage devices. The redundant RAID span 206 illustrated in the preceding FIGUREs, for example, employs four (4) physical storage disks for a RAID configuration that spans three (3) disks. Disclosed data storage methods ensure that any stripe of data is stored on three distinct physical storage devices regardless of whether one or more unrecoverable errors, and the corresponding relocations of data have occurred.

Figure 7:
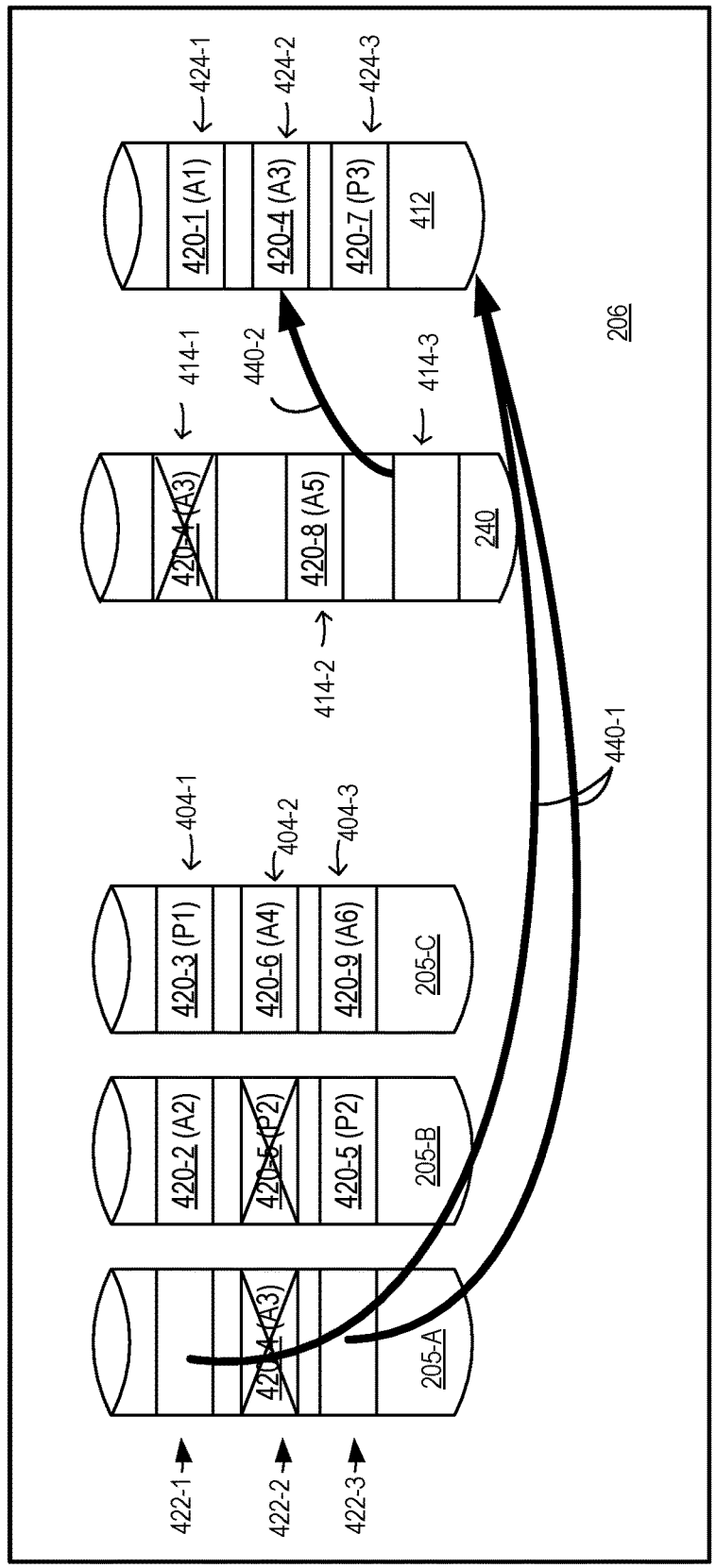

Referring now to FIG. 7, a subsequent state of redundant RAID span 206 is illustrated. Physical storage device 205-A, as an example, reports a DEVICE COUNT event when the number of unrecoverable blocks on physical storage device 205-A exceeds the DEVICE COUNT threshold. The DEVICE COUNT may be employed to address reliability concerns that may be associated with using physical storage devices that have one or more previously reported unrecoverable errors.

The redundant RAID span 206 illustrated in FIG. 7 may impose a DEVICE COUNT on any or all physical storage devices 205. If the number of unrecoverable errors reported by a particular physical storage device 205 exceeds the DEVICE COUNT, the illustrated storage management methods may replace the applicable physical storage device 205 with replacement physical storage device 412. The DEVICE COUNT threshold may be adjusted to achieve a particular objective. For example, if historical data suggests a relationship between the previously reported number of unrecoverable errors and the likelihood of one or more additional unrecoverable errors in the future, the DEVICE COUNT threshold may be set based on such data. As an illustration, if a function F(n), where n is the number of unrecoverable errors previously reported, approximates the probability of a next unrecoverable error occurring within a particular interval of time T, the DEVICE COUNT threshold may be set to a particular value of n that reflects a particular F(n). In this manner, should the historical data suggest that F(n) does not show a significant increase for n<n1, n1 may be set as the DEVICE COUNT threshold. More generally, the DEVICE COUNT threshold may be set to enforce any desired limit on the number of unrecoverable errors redundant RAID span 206 may sustain on any individual physical storage device 205 before replacing the physical storage device. Regardless of the particular value selected for DEVICE COUNT, the detection of a DEVICE COUNT event associated with a particular physical storage device initiates operations illustrated in FIG. 7.

FIG. 7 illustrates the replacement of physical storage device 205-A with replacement storage device 412 in response to a DEVICE COUNT event associated with physical storage device 205-A. The operations resulting from a DEVICE COUNT event associated with the physical storage device 205-A illustrated in FIG. 7 include a first operation 440-1, in which "good" logical block addresses 404 on physical storage device 205-A are copied directly corresponding logical block addresses 424 of replacement storage device 412.

FIG. 7 further illustrates one or more additional operations 440-2, following completion of first operation 440-1, in which relocated logical blocks associated with unrecoverable blocks of physical storage device 205-A are copied from distributed hot spare 240 to respective logical block addresses 424 of replacement storage device 412. Although FIG. 7 illustrates just one relocated logical block copied from hot spare drive 240 to replacement storage device 412, it will be readily appreciated additional logical blocks not depicted in FIG. 7 may be transferred during operation 440-2.

The storage management operations associated with the operations illustrated in FIG. 7 may include accessing and updating the logical block maps 300 (not depicted in FIG. 7) of physical storage device 205-A, hot spare drive 240, and replacement storage drive 412. Updating the applicable logical block maps 300 may include removing the logical block map 300 physical storage device 205-A and updating map entries associated with the hot spare driver 240 to remove all hot spare drive blocks that were relocated from physical storage device 205-A.

After all good blocks from physical storage device 205-A and all relocated blocks originating from physical storage device 205-A have been copied to the replacement physical storage device 412 and all logical block map entries pertaining to the applicable storage drives have been updated, the storage management operations represented in FIG. 7 may remove or otherwise mark physical storage drive 205-A as failed. In addition, a logical block map 300 (not depicted) may be generated for the replacement storage device 412, which may then be configured as one of the physical disks of the RAID 5 span 206 illustrated in FIG. 7.

Figure 8:
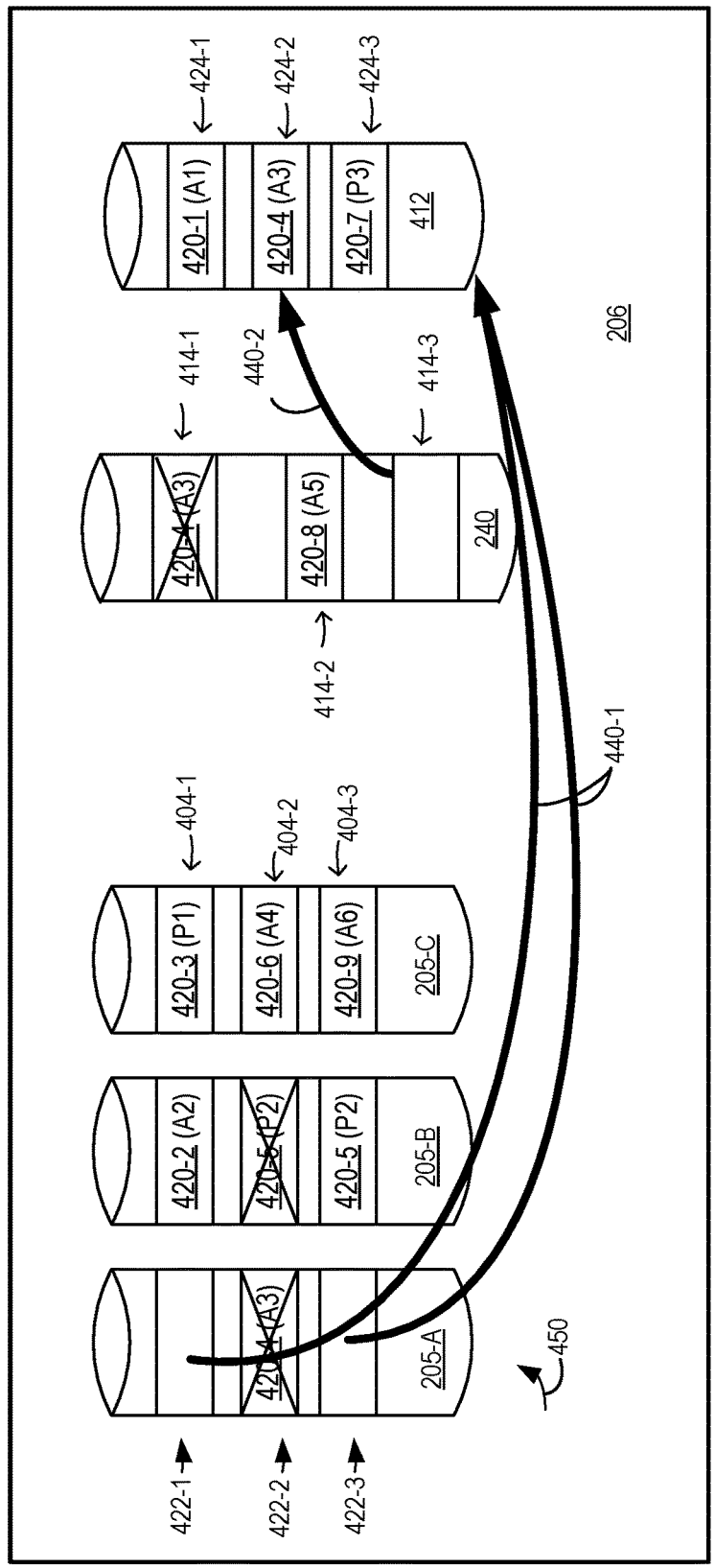
FIG. 8 illustrates a SPARE COUNT event, in accordance with embodiments of the present disclosure.

FIG. 8 illustrates the use of a SPARE COUNT as a second parameter that may be employed, enforced, or otherwise observed to address reliability concerns that may occur with respect to operating a virtual drive using one or more physical storage devices with one or more known unrecoverable errors. FIG. 8 illustrates a SPARE COUNT event that occurs when the total number of unrecoverable blocks relocated to distributed hot spare 240 exceeds the SPARE COUNT threshold. The number of unrecoverable blocks relocated to distributed hot spare 240 is an indicator of the total number of unrecoverable blocks on redundant RAID span 206, including any unrecoverable blocks reported by the distributed hot spare itself.

The SPARE COUNT operations or processes that redundant RAID span 206 may employ include an initial determination 450 of the physical storage device 205 having the most unrecoverable blocks. To determine which physical storage device 205 includes the most unrecoverable blocks, the DEVICE COUNT for each physical storage device 205 is read. For purposes of illustration, the initial determination 450 in FIG. 8 indicates that physical storage device 205-A has the most unrecoverable blocks. If two or more physical storage devices have the same number of unrecoverable blocks, the physical storage device chosen for replacement made be determined in accordance with additional criteria including, as examples, the physical storage device 205: with the most recent unrecoverable error, storing the most user data, storing the least user data, etc.

Following identification of the physical storage device 205 having the most unrecoverable blocks, the operations of the illustrated embodiment of FIG. 8 are substantially the same as the replacement of physical storage device 205-A subsequent to a DEVICE COUNT event associated with physical storage device 205-A as described in the preceding text addressing FIG. 7.

Any one or more processes or methods described above, including processes and methods associated with the FIGUREs flow diagrams, may be embodied as a computer readable storage medium or, more simply, a computer readable medium including processor-executable program instructions, also referred to as program code or software, that, when executed by the processor, cause the processor to perform or otherwise results in the performance of the applicable operations.

A computer readable medium, which may also be referred to as computer readable memory or computer readable storage, encompasses volatile and non-volatile medium, memory, and storage, whether programmable or not, whether randomly accessible or not, and whether implemented in a semiconductor, ferro-magnetic, optical, organic, or other suitable medium. Information handling systems may include two or more different types of computer readable medium and, in such systems, program code may be stored, in whole or in part, in two or more different types of computer readable medium.

Unless indicated otherwise, operational elements of illustrated or described methods may be combined, performed simultaneously, or performed in a different order than illustrated or described. In this regard, use of the terms first, second, etc. does not necessarily denote any order, importance, or preference, but may instead merely distinguish two or more distinct elements.

Program code for effecting described operations may be written in any appropriate combination of programming languages and encompasses human readable program code including source code as well as machine readable code including object code. Program code may be executed by a general purpose processor, a special purpose processor, including, as non-limiting examples, a graphics processor, a service processor, or an embedded processor or controller.

Disclosed subject matter may be implemented in any appropriate combination of software, firmware, and hardware. Terms including circuit(s), chip(s), processor(s), device(s), computer(s), desktop(s), laptop(s), system(s), and network(s) suggest at least some hardware or structural element(s), but may encompass non-transient intangible elements including program instruction(s) and one or more data structures including one or more databases.

While the disclosure has been described with reference to exemplary embodiments, it will be understood by those skilled in the art that the disclosure encompasses various changes and equivalents substituted for elements. Therefore, the disclosure is not limited to the particular embodiments expressly disclosed, but encompasses all embodiments falling within the scope of the appended claims.

As used herein, the singular forms "a", "an" and "the" are intended to include the plural forms as well, unless the context clearly indicates otherwise. It will be further understood that the terms "comprises" and/or "comprising," when used in this specification indicates the presence of stated features, operations, elements, and/or components, but does not preclude the presence or addition of one or more other features, operations, elements, components, and/or groups thereof.

What is claimed is:

1. A storage method, comprising:
   detecting an unrecoverable error associated with a particular logical block of a virtual drive comprising a plurality of physical storage devices and a hot spare drive;
   identifying a particular source disk and a particular stripe associated with the particular logical block address;
   determining whether the unrecoverable error is a first error associated with the particular stripe;
   responsive to determining the unrecoverable error is the first error associated with the particular stripe, performing operations comprising:

regenerating data corresponding to the particular logical block from remaining source disks in the virtual drive;

storing the regenerated data to a first stripe of the hot spare drive; and creating an entry in a mapping structure, the entry associating the particular source disk and the particular stripe of the particular logical block address with the first stripe of the hot spare drive; and responsive to determining the unrecoverable error is not the first unrecoverable error associated with the particular stripe, performing operations comprising:

copying a different logical block, stored in a different stripe of the particular source disk, to a second stripe of the hot spare drive;

regenerating the logical block from:
　the first stripe of the hot spare drive; and
　unmapped portions of the particular stripe on other source disks;

storing the regenerated logical block to the different stripe;

creating an entry mapping the particular logical block to the different stripe; and creating an entry mapping the different logical block to the second stripe of the hot spare drive.

2. The method of claim 1, further comprising:
detecting an unrecoverable error associated with the first stripe of the hot spare drive;
regenerating data for the first stripe of the hot spare drive;
storing the regenerated data to a second stripe of the hot spare drive.

3. The method of claim 2, wherein regenerating the first stripe of the distributed hot spare drive includes regenerating from at least one remapped stripe.

4. The method of claim 3, wherein the remapped stripe is remapped to a source disk.

5. The method of claim 3, wherein the remapped stripe is remapped to the hot spare drive.

6. The method of claim 1, further comprising:
detecting a number of logical block errors on a first source disk exceeding a single disk threshold; and
performing replacement operations comprising:
　copying remaining good blocks of the first source disk to a replacement disk;
　copying remapped portions of the first source disk to the replacement disk; and
　removing from the mapping structure, entries associated with the first source disk.

7. The method of claim 1, further comprising:
responsive to detecting a total number of logical block errors for the virtual drive exceeding a virtual drive threshold, performing operations comprising:
　identifying a candidate source disk based on a number of logical block errors associated with the candidate source disk;
　copying remaining good blocks of the candidate source disk to a replacement disk;
　copying remapped portions of the first source disk to the replacement disk; and
　removing from the mapping structure, entries associated with the first source disk.

8. A storage controller comprising:
a processor; and
a computer readable medium including processor executable instructions that, when executed by the processor, cause the processor to perform operations comprising:

detecting an unrecoverable failure associated with a logical block of a first physical storage device, wherein the first physical storage device comprises a first physical storage device of a redundant array of inexpensive drives (RAID) 5 virtual drive, the logical block comprises a first logical block of a data stripe, and wherein rebuilding data for the logical block comprises performing an exclusive or (EXOR) operation on remaining portions of the data stripe in the remaining physical storage devices;

rebuilding data for the logical block from data in remaining physical storage devices of the virtual drive;

storing rebuilt data resulting from the rebuilding of data in a first logical block of a hot spare drive;

maintaining an address map for the first physical storage device, wherein the address map:
　identifies logical blocks of the first physical storage device containing unrecoverable failures associated with the first physical storage device; and
　indicates relocated logical blocks for each of the logical blocks identified;

detecting a second unrecoverable error associated with a second logical block on a second physical storage device of the virtual drive;

determining whether a data stripe corresponding to the second logical block includes any other logical blocks associated with a unrecoverable error; and responsive to determining that the second logical block is of the same data stripe as the first logical block, performing same-stripe rebuilding operations comprising:
　copying data for a different logical block of the second physical storage device to a distributed hot spare drive; and
　performing an exclusive OR (EXOR) of:
　　the relocated first logical block on the distributed hot spare drive; and
　　a third logical block, associated with a third physical storage device, of the virtual drive.

9. The storage controller of claim 8, wherein the operations include maintaining a respective address map for each of the plurality of physical storage devices.

10. The storage controller of claim 8, wherein the operations include:
detecting a third unrecoverable error associated with a first logical block of the distributed hot spare drive;
rebuilding the data from:
　the relocated logical block of the second physical storage device; and
　the third logical block associated with the third physical storage device.

11. The storage controller of claim 8, wherein the operations include:
detecting a DEVICE COUNT event triggered by a quantity of unrecoverable errors associated with a particular physical storage device exceeding a DEVICE COUNT threshold; and
performing replacement operations comprising:
　copying remaining good blocks of the first source disk to a replacement disk;
　copying remapped portions of the first source disk to the replacement disk; and
　removing from the mapping structure, entries associated with the first source disk.

12. The storage controller of claim 11, wherein the operations include:

detecting a SPARE COUNT event triggered by a quantity of rebuilt logical blocks stored on the hot spare drive associated with a particular physical storage device exceeding a DEVICE COUNT threshold;

identifying a candidate source disk based on a number of logical block errors associated with the candidate source disk;

copying remaining good blocks of the candidate source disk to a replacement disk;

copying remapped portions of the first source disk to the replacement disk; and removing from the mapping structure, entries associated with the first source disk.

13. An information handling system, comprising:

a processor; and computer readable storage accessible to the processor and including processor executable program instructions that, when executed by the processor, cause the processor to perform operations comprising:

detecting an unrecoverable failure associated with a logical block of a first physical storage device, wherein the first physical storage device comprises a first physical storage device of a redundant array of inexpensive drives (RAID) 5 virtual drive and the logical block comprises a first logical block of a data stripe, and;

rebuilding data for the logical block from data in remaining physical storage devices of the virtual drive wherein rebuilding data for the logical block comprises performing an exclusive or (EXOR) operation on remaining portions the data stripe in the remaining physical storage devices;

storing rebuilt data resulting from the rebuilding of data in a first logical block of a hot spare drive; and maintaining an address map for the first physical storage device, wherein the address map:

identifies logical blocks of the first physical storage device containing unrecoverable failures associated with the first physical storage device; and indicates relocated logical blocks for each of the logical blocks identified;

detecting a second unrecoverable error associated with a second logical block on a second physical storage device of the virtual drive;

determining whether a data stripe corresponding to the second logical block includes any other logical blocks associated with a unrecoverable error; and responsive to determining that the second logical block is of the same data stripe as the first logical block, performing same-stripe rebuilding operations comprising:

copying data for a different logical block of the second physical storage device to the distributed hot spare; and performing an exclusive OR (EXOR) of:

the relocated first logical block on the hot spare drive; and a third logical block, associated with a third physical storage device, of the virtual drive.

* * * * *